United States Patent
Fuchie

(10) Patent No.: US 7,768,521 B2
(45) Date of Patent: Aug. 3, 2010

(54) IMAGE PROCESSING APPARATUS AND IMAGE PROCESSING METHOD

(75) Inventor: Takaaki Fuchie, Kanagawa (JP)

(73) Assignee: Sony Corporation, Tokyo (JP)

( * ) Notice: Subject to any disclaimer, the term of this patent is extended or adjusted under 35 U.S.C. 154(b) by 812 days.

(21) Appl. No.: 11/685,418

(22) Filed: Mar. 13, 2007

(65) Prior Publication Data
US 2007/0216695 A1    Sep. 20, 2007

(30) Foreign Application Priority Data
Mar. 17, 2006   (JP)   ............... 2006-074718

(51) Int. Cl.
  *G06F 13/00*   (2006.01)
  *G09G 5/36*   (2006.01)
(52) U.S. Cl. .............. 345/536; 345/537; 345/557; 345/552
(58) Field of Classification Search ........ 345/536, 345/537, 557; 714/762, 764, 765, 768
See application file for complete search history.

(56) References Cited

U.S. PATENT DOCUMENTS 5,867,727 A * 2/1999 Hattori ............ 710/4

FOREIGN PATENT DOCUMENTS

| JP | 8-110875 | 4/1996 |
|---|---|---|
| JP | 10-260899 | 9/1998 |
| JP | 2000-89985 | 3/2000 |
| JP | 2000-245966 | 9/2000 |
| JP | 2000-285019 | 10/2000 |
| JP | 2001-209811 | 8/2001 |
| JP | 2002-83316 | 3/2002 |
| JP | 2005-25749 | 1/2005 |
| JP | 2005-62946 | 3/2005 |
| JP | 2005-276194 | 10/2005 |

* cited by examiner

*Primary Examiner*—Hau H Nguyen
(74) *Attorney, Agent, or Firm*—Oblon, Spivak, McClelland, Maier & Neustadt, L.L.P.

(57) ABSTRACT

Disclosed herein is an image processing apparatus, including: first storage means for storing data in a unit of a word; second storage means for storing data in a unit of a word, address information for managing writing and reading out of the data of a unit of a word and a correction flag which indicates, in a unit of a word, whether or not it is necessary to correct the data, in an associated relationship with each other; and supplying means for reading out and supplying the data of a unit of a word, corresponding address information and a corresponding correction flag stored in the second storage means to the first storage means; the first storage means referring to the address information to correct the data of a unit of a word corresponding to the correction flag to the data of a unit of a word.

6 Claims, 10 Drawing Sheets

FIG.6

| 1 | 3 | C | 8 | 3 | 4 |
|---|---|---|---|---|---|
| 0001 | 0011 | 1100 | 1000 | 0011 | 0100 |

ADDRESS INFORMATION · ENTRY NUMBER · OFFSET

IMAGE PROCESSING APPARATUS AND IMAGE PROCESSING METHOD

CROSS REFERENCES TO RELATED APPLICATIONS

The present invention contains subject matter related to Japanese Patent Application JP 2006-074718 filed in the Japan Patent Office on Mar. 17, 2006, the entire contents of which being incorporated herein by reference.

BACKGROUND OF THE INVENTION

1. Field of the Invention

This invention relates generally to an image processing apparatus and an image processing method and more particularly to an image processing apparatus and an image processing method which can save the memory area and reduce the power consumption and the production cost while maintaining a high access efficiency to a memory for storing data.

2. Description of the Related Art

An existing image transform apparatus which performs transform of an image in a virtual three-dimensional space produces a model of a body shape composed of a combination of polygons such as triangles and performs texture mapping of affixing an image to the model to perform transform of the image. The image transform apparatus is disclosed, for example, in Japanese Patent Laid-Open NO. 2002-83316.

Such an image transform apparatus as described above produces, for texture mapping, a texture address, which represents the position of each pixel of an image after transform to be outputted finally on an image to be affixed in texture mapping, in a unit of a polygon corresponding to the pixel. Then, the texture address is stored for each pixel into a memory.

At this time, the image transform apparatus stores the texture address into an address of the memory corresponding to the position of a pixel corresponding to the texture address on a screen. Accordingly, the texture address produced for each polygon is stored for each pixel into a random address of the memory. In other words, in order to store a texture address, random accessing to the memory is requisite.

Incidentally, as a memory which allows reading out and writing, an SRAM (Static Random Access Memory), an SDRAM (Synchronous Dynamic Random Access Memory) and so forth are available. For example, according to the SDRAM which is more advantageous than the SRAM in terms of the cost, the memory access efficiency is improved by using burst reading/burst writing of data.

Accordingly, where the image transform apparatus uses the SDRAM as a memory for storing texture addresses, in order to perform collective writing of texture addresses, a cache of the write back type is used to perform writing of texture addresses.

In this instance, the cache first reads texture addresses stored already in a plurality of successive addresses of an SDRAM including SDRAM addresses, in which texture addresses to be made an object of writing are stored, in a unit of a cache block (cache line), which is a storage unit of the cache, from the SDRAM.

Then, the texture addresses of an object of writing are overwritten in a region (hereinafter referred to as cache block region) of a cache block size corresponding to the addresses of the SDRAM in which the texture addresses of an object of writing are stored. Then, when eviction of a cache block is to be performed, the cache collectively writes the texture addresses in the overwritten cache block region into addresses of the SDRAM corresponding to the texture addresses.

Then, the cache collectively reads in the texture addresses stored in a plurality of successive addresses of the SDRAM as a cache block in a unit of a cache block from the SDRAM. Then, the texture addresses stored in the random addresses of the SDRAM are updated on the cache. By this, the texture addresses can be written collectively into the SDRAM.

SUMMARY OF THE INVENTION

However, reading in of the texture addresses from the SDRAM by the cache is performed in order to collectively write the texture addresses into the SDRAM, and the texture addresses thus read in are not used in actual processing. In other words, the image transform apparatus has to access the SDRAM uselessly in order to collectively write the texture addresses into the SDRAM. Therefore, the image transform apparatus uselessly uses the memory area.

As a result, the image transform apparatus needs to access the memory at a high speed and prepare a plurality of memories juxtaposed in parallel, and this increases the power consumption and the production cost.

Therefore, it is desirable to provide an image processing apparatus and an image processing method which can save the memory area and reduce the power consumption and the production cost while maintaining a high access efficiency to a memory for storing data.

According to an embodiment of the present invention, there is provided an image processing apparatus including first storage means for storing data in a unit of a word, second storage means for storing data in a unit of a word, address information for managing writing and reading out of the data of a unit of a word and a correction flag which indicates, in a unit of a word, whether or not it is necessary to correct the data stored in the first storage means, in an associated relationship with each other, and supplying means for reading out and supplying the data of a unit of a word, corresponding address information and a corresponding correction flag stored in the second storage means to the first storage means, the first storage means referring to the address information supplied from the supplying means to correct the data of a unit of a word corresponding to the correction flag supplied from the supplying means to the data of a unit of a word supplied from the supplying means.

The image processing apparatus may be configured such that the second storage means stores supplying information which indicates whether or not the data of a unit of a word is to be supplied preferentially to the first storage means, and the supplying means selects data of a unit of a word to be set as a supplying object from the data of a unit of a word stored in the second storage means based on the supplying information stored in the second storage means and supplies the data of a unit of a word set as a supplying object, corresponding address information and a corresponding correction flag to the first storage means.

In this instance, the image processing apparatus may be configured such that the second storage means stores the supplying information in an associated relationship with data of a unit of a word which is set as a storage object so that, when compared with data of a unit of plural words which forms the data of a unit of a word, data of a unit of plural words which form data of a unit of a word stored prior to the data of a unit of a word is stored preferentially into the first storage means.

The image processing apparatus may further include production means for producing apex data, which are data regarding apexes of a polygon, in a unit of a polygon, and conversion means for converting the apex data into pixel data which are data of a unit of a pixel regarding pixels corresponding to the polygons.

According to another embodiment of the present invention, there is provided an image processing method including a first storage step of storing data in a unit of a word into first storage means, a second storage step of storing data of a unit of a word, address information for managing writing and reading out of the data of a unit of a word and a correction flag which indicates, in a unit of a word, whether or not it is necessary to correct the data stored at the first storage step, in an associated relationship with each other into second storage means, and a supplying step of reading out and supplying the data of a unit of a word, corresponding address information and a corresponding correction flag to the first storage means, and wherein, at the first storage step, the address information supplied at the supplying step is referred to correct the data of a unit of a word corresponding to the correction flag supplied at the supplying step to data of a unit of a word supplied at the supplying step.

In the image processing apparatus and the image processing method, data are stored in a unit of a word into the first storage means. Further, data of a unit of a word, address information for managing writing and reading out of the data of a unit of a word and a correction flag which indicates, in a unit of a word, whether or not it is necessary to correct the stored data, are stored in an associated relationship with each other into the second storage means. Then, the data of a unit of a word, corresponding address information and a corresponding correction flag are read out from the second storage means and supplied to the first storage means. Then, upon the storage into the first storage means, the address information supplied is referred to correct the data of a unit of a word corresponding to the correction flag to data of a unit of a word.

Thus, with the image processing apparatus and the image processing method, an image can be transformed.

Further, with the image processing apparatus and the image processing method, the memory area can be saved and the power consumption and the production cost can be reduced while maintaining a high access efficiency to the memory for storing data.

BRIEF DESCRIPTION OF THE DRAWINGS

FIG. 6 is a diagrammatic view illustrating an example of a texture word unit address;

DETAILED DESCRIPTION OF THE PREFERRED EMBODIMENT

Figure 1:
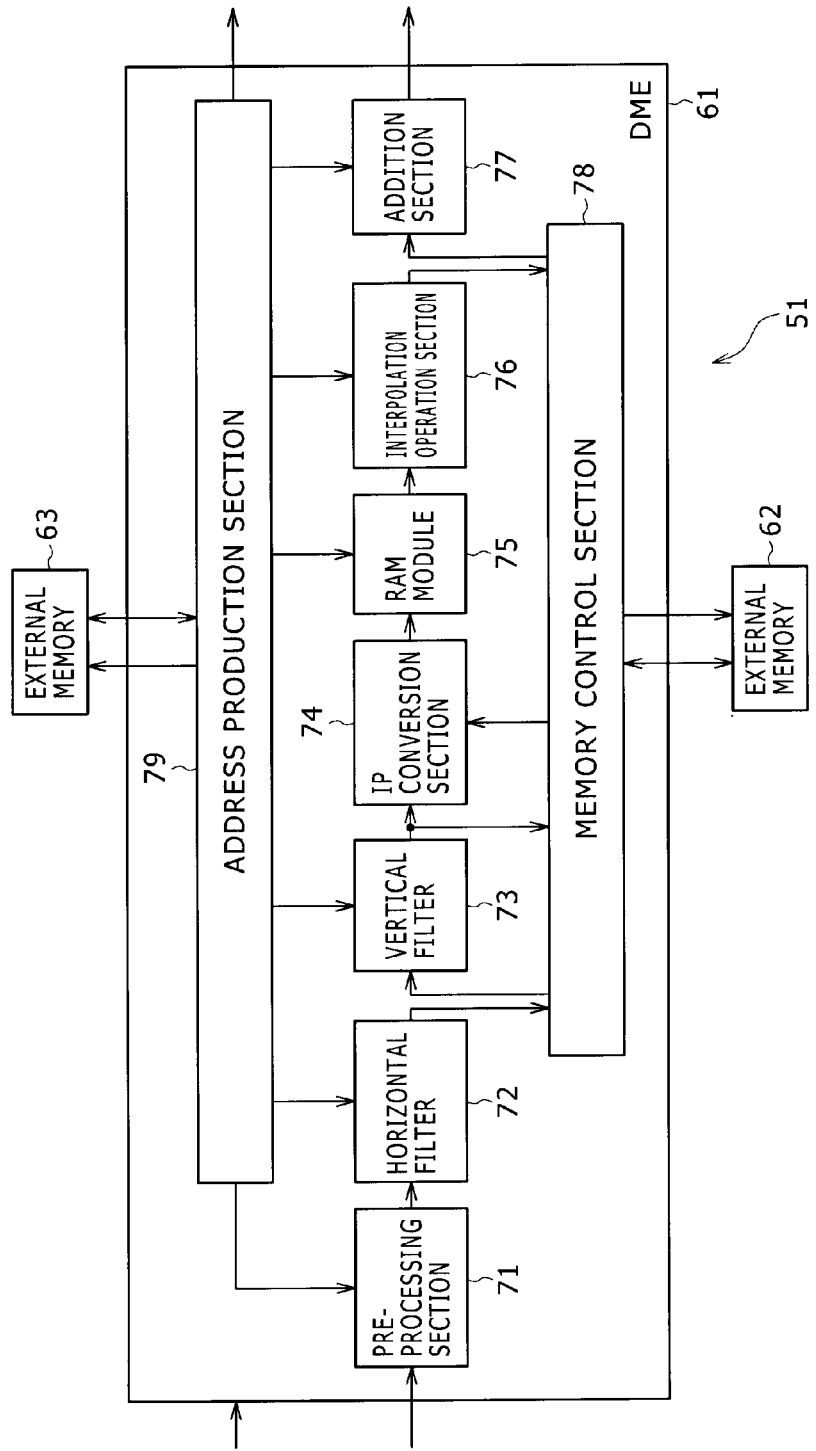
FIG. 1 is a block diagram showing an example of a configuration of an image processing system to which the present invention is applied.

FIG. 1 shows an example of a configuration of an image processing system 51 to which the present invention is applied.

Referring to FIG. 11 the image processing system 51 shown includes a digital image special effect apparatus (Digital Multi Effects apparatus) (hereinafter referred to simply as DME) 61, an external memory 62, and another external memory 63. The image processing system 51 performs reduction, enlargement, change of the type, rotation, leftward and rightward reversal, inversion or movement of an input image which is an image of a unit of a field inputted thereto or applies a special effect to an input image to transform the input image and outputs a resulting image of a unit of a frame. The special effect may be, for example, a mosaic effect, a posterization effect, a negative/positive reversal effect or a defocusing effect in the horizontal direction or the vertical direction.

It is to be noted that the input image is formed from pixel values which represent a luminance signal, a color difference signal and a key signal, which is used for keying, of pixels. Further, the components of the image processing system 51 execute various processes in accordance with a program stored in the external memory 63.

The DME 61 is formed from, for example, an IC (Integrated Circuit), an LSI. The DME 61 includes a pre-processing section 71, a horizontal filter 72, a vertical filter 73, an IP (Interlace Progressive) conversion section 74, a RAM (Random Access Memory) module 75, an inter polation operation section 76, an addition section 77, a memory control section 78 and a address production section 79.

The DME 61 receives an input image, which is an image to be applied upon texture mapping, and a timing signal supplied thereto. The input image is supplied to the pre-processing section 71. The timing signal is supplied to the components of the DME 61 so that the components may perform respective processes in response to the timing signal.

The pre-processing section 71 applies such special effects as mosaic, posterization and positive/negative reversal effects to the input image in response to an instruction signal supplied thereto from the address production section 79. In particular, the pre-processing section 71 performs a filtering process for predetermined ones of pixels, which form the input image, in a unit of a pixel thereby to apply a mosaic effect to the input image. Further, the pre-processing section 71 changes the number of gradations of pixel values of the pixels which form the input image thereby to apply posterization to the input image. Furthermore, the pre-processing section 71 reverses the gradations of the pixel values of the pixels which form the input image thereby to apply positive/negative reversal to the input image. The pre-processing section 71 supplies an image of a unit of a field obtained as a result of the application of special effects to the horizontal filter 72.

The horizontal filter 72 receives a reduction ratio in the horizontal direction supplied thereto from the address production section 79. Then, in order to remove aliasing components in the horizontal direction which appear when an image is reduced, the horizontal filter 72 performs a filtering process corresponding to the received reduction ratio in the horizontal direction for an image in a unit of a field received from the pre-processing section 71. Further, the horizontal filter 72 applies defocusing in the horizontal direction as a special effect to the image in a unit of a field from the pre-processing section 71 in response to an instruction signal supplied thereto from the address production section 79. The horizontal filter 72 supplies an image of a unit of a field obtained as a result of the application of the filtering process or the defocusing process in the horizontal direction to the external memory 62 through the memory control section 78 so that the image is stored into the external memory 62.

The vertical filter 73 receives a reduction ratio in the vertical direction supplied thereto from the address production section 79. Further, in order to remove aliasing components in the vertical direction, which appear when an image is reduced, the vertical filter 73 performs a filtering process corresponding to the received reduction ratio in the vertical direction for an image in a unit of a field supplied thereto from the memory control section 78 and read out in the vertical direction from the external memory 62. Further, the vertical filter 73 performs defocusing in the vertical direction as a special effect for the image in a unit of a field from the memory control section 78 in response to an instruction signal supplied thereto from the address production section 79. The vertical filter 73 supplies an image of a unit of a field obtained as a result of the application of the filtering process or the defocusing process in the vertical direction to the IP conversion section 74. The vertical filter 73 supplies the image also to the external memory 62 through the memory control section 78 so that the image is stored into the external memory 62.

The IP conversion section 74 IP converts an image (interlaced image) in a unit of a field supplied thereto from the vertical filter 73 by referring to another image of a unit of a field immediately preceding to the image and a further image of a unit of a field preceding to the immediately preceding image. Both preceding images are supplied from the memory control section 78 to the IP conversion section 74. The IP conversion section 74 supplies an image (progressive image) of a unit of a frame obtained as a result of the IP conversion to the RAM module 75.

The RAM module 75 stores an image in a unit of a frame from the IP conversion section 74. Further, the RAM module 75 reads out, based on the integral part of a texture address supplied from the address production section 79, that is, the integral part of the coordinate value in the horizontal direction and the integral part of the coordinate value in the vertical direction of the coordinates of those pixels (hereinafter referred to as interpolation pixels) which make an object of inter polation operation by the inter polation operation section 76 on the input image, a plurality of pixel values of different pixels to be used for interpolation of the interpolation pixels from among pixel values of pixels which compose an image in a unit of a frame stored already in the RAM module 75 as a pixel value group. For example, the RAM module 75 reads out 64 pixel values of different pixels around an interpolation pixel as a pixel value group. The RAM module 75 supplies the read out pixel value group to the inter polation operation section 76.

It is to be noted that, as regards the coordinate system on the input image, the coordinate values of the pixels which compose the input image in the horizontal direction and the vertical direction are integral values.

The inter polation operation section 76 performs inter polation operation based on values of the decimal part of the texture address, that is, the decimal part of the coordinate values in the horizontal and vertical directions of the coordinates of interpolation pixels on the input image supplied from the address production section 79 and a pixel value group supplied from the RAM module 75 to interpolate the pixel values of the interpolation pixels to perform texture mapping. The inter polation operation section 76 supplies an image in a unit of a frame after interpolation to the external memory 62 through the memory control section 78 so as to be stored into the external memory 62.

The addition section 77 applies shading using a writing coefficient for each interpolation pixel supplied thereto from the address production section 79. The addition section 77 outputs an image after the addition as an image after transform.

The memory control section 78 controls writing into and reading out from the external memory 62. In particular, the memory control section 78 supplies a control signal for controlling writing into the external memory 62 to the external memory 62 and supplies an image supplied from the horizontal filter 72, vertical filter 73 or inter polation operation section 76 to the external memory 62 so that the image is written into the external memory 62.

Further, the memory control section 78 supplies a control signal for controlling reading out of an image from the external memory 62 to the external memory 62 to control reading out from the external memory 62. Furthermore, the memory control section 78 supplies an image read out from the external memory 62 as a result of the control to the vertical filter 73, IP conversion section 74 and addition section 77.

The address production section 79 controls the components of the image processing system 51 in response to an instruction from a user to transform an input image. Further, the address production section 79 controls writing into and reading out from the external memory 63.

In particular, the address production section 79 supplies an intermediate result or a final result of processing to the external memory 63 together with a control signal for controlling writing into the external memory 63 so as to be stored into the external memory 63. Further, the address production section 79 supplies a control signal for controlling reading out of an intermediate result or a final result of processing from the external memory 63 to the external memory 63 so as to control reading out from the external memory 63 thereby to read out an intermediate or final result of processing from the external memory 63. Details of the address production section 79 are hereinafter described with reference to FIG. 3.

Now, an image transform process executed by the image processing system 51 of FIG. 1 to transform an input image is described with reference to FIG. 2. The image transform process is started, for example, when an input image is inputted to the image processing system 51.

At step S1, the pre-processing section 71 performs such a process as mosaic, posterization or positive/negative reversal for the input image in response to an instruction signal supplied thereto from the address production section 79. Then, the pre-processing section 71 supplies an image of a unit of a field obtained as a result of the process to the horizontal filter 72, whereafter the processing advances to step S2. It is to be noted that, if an instruction signal is not supplied from the address production section 79, then the processing skips step S1 and advances to step S2.

At step S2, the horizontal filter 72 performs, in response to a reduction ratio in the horizontal direction supplied thereto from the address production section 79, a filtering process corresponding to the reduction ratio in the horizontal direction for the image of a unit of a field from the pre-processing section 71. Further, the horizontal filter 72 performs a defocusing process in the horizontal direction as a special effect for the image in response to an instruction signal supplied from the address production section 79. Then, the horizontal filter 72 supplies the image of a unit of a field obtained as a result of the filtering process and/or the defocusing process in the horizontal direction performed for the image to the memory control section 78.

After the process at step S2, the processing advances to step S3, at which the memory control section 78 supplies the image of a unit of a field supplied thereto from the horizontal filter 72 together with a control signal for controlling writing into the external memory 62 to the external memory 62 so that the image may be stored into the external memory 62. After the process at step S3, the processing advances to step S4, at which the memory control section 78 supplies a control signal for controlling reading out of an image from the external memory 62 to the external memory 62. Consequently, the image of a unit of a field stored at step S3 is read out in the vertical direction from the external memory 62 and supplied to the vertical filter 73.

After the process at step S4, the processing advances to step S5, at which the vertical filter 73 performs, in response to a reduction ratio in the vertical direction supplied from the address production section 79, a filtering process corresponding to the reduction ratio in the vertical direction for the image of a unit of a field supplied from the memory control section 78. Further, the vertical filter 73 performs a defocusing process in the vertical direction as a special effect for the image of a unit of a field in response to an instruction signal supplied from the address production section 79. Then, the vertical filter 73 supplies an image in a unit of a field obtained as a result of filtering process and/or the defocusing process to the IP conversion section 74 and also to the memory control section 78.

After the process at step S5, the processing advances to step S6, at which the memory control section 78 supplies the image in a unit of a field supplied from the memory control section 78 together with a control signal for controlling writing into the external memory 62 to the external memory 62 so that the image is stored into the external memory 62. After the process at step S6, the processing advances to step S7. At step S7, the memory control section 78 supplies a control signal for controlling reading out of the image from the external memory 62 to the external memory 62 to read out the image of a unit of a field immediately preceding to the image of a unit of a field and stored by the process at step S6 in the immediately preceding operation cycle and the immediately preceding image of a unit of a field from the external memory 62 and supplies the read out images to the IP conversion section 74.

After the process at step S7, the processing advances to step S8, at which the IP conversion section 74 refers to the two images supplied thereto from the memory control section 78 at step S7 to IP convert the image of a unit of a field supplied from the vertical filter 73 at step S5. Then, the IP conversion section 74 supplies an image of a unit of a frame obtained as a result of the IP conversion to the RAM module 75.

At step S9, the PAM module 75 stores an image in a unit of a frame from the IP conversion section 74, whereafter the processing advances to step S10.

At step S10, the PAM module 75 reads out, based on the integral part of the texture address supplied from the address production section 79, a plurality of pixel values of different pixels to be used for interpolation of interpolation pixels as a pixel value group from the pixel values of the pixels which compose an image in a unit of a frame stored already. The pixel value group is supplied to the inter polation operation section 76.

After the process at step S10, the processing advances to step S11, at which the inter polation operation section 76 performs, based on the decimal part of the texture address supplied from the address production section 79 and the pixel value group supplied from the RAM module 75, inter polation operation to interpolate the pixel values of the interpolation pixels. Then, the inter polation operation section 76 supplies an image after the interpolation to the memory control section 78.

After the process at step S11, the processing advances to step S12, at which the memory control section 78 supplies the image from the inter polation operation section 76 together with a control signal for controlling writing into the external memory 62 to the external memory 62 so that the image is stored into the external memory 62. After the process at step S12, the processing advances to step S13, at which the memory control section 78 supplies a control signal for controlling reading out of an image from the external memory 62 to the external memory 62 to read out the image stored at step S12. Thereafter, the processing advances to step S14.

At step S14, the addition section 77 adds shading to the image using a writing coefficient supplied thereto from the address production section 79. Then, the addition section 77 outputs the image after the addition as an image after the conversion, thereby ending the processing.

Figure 2:
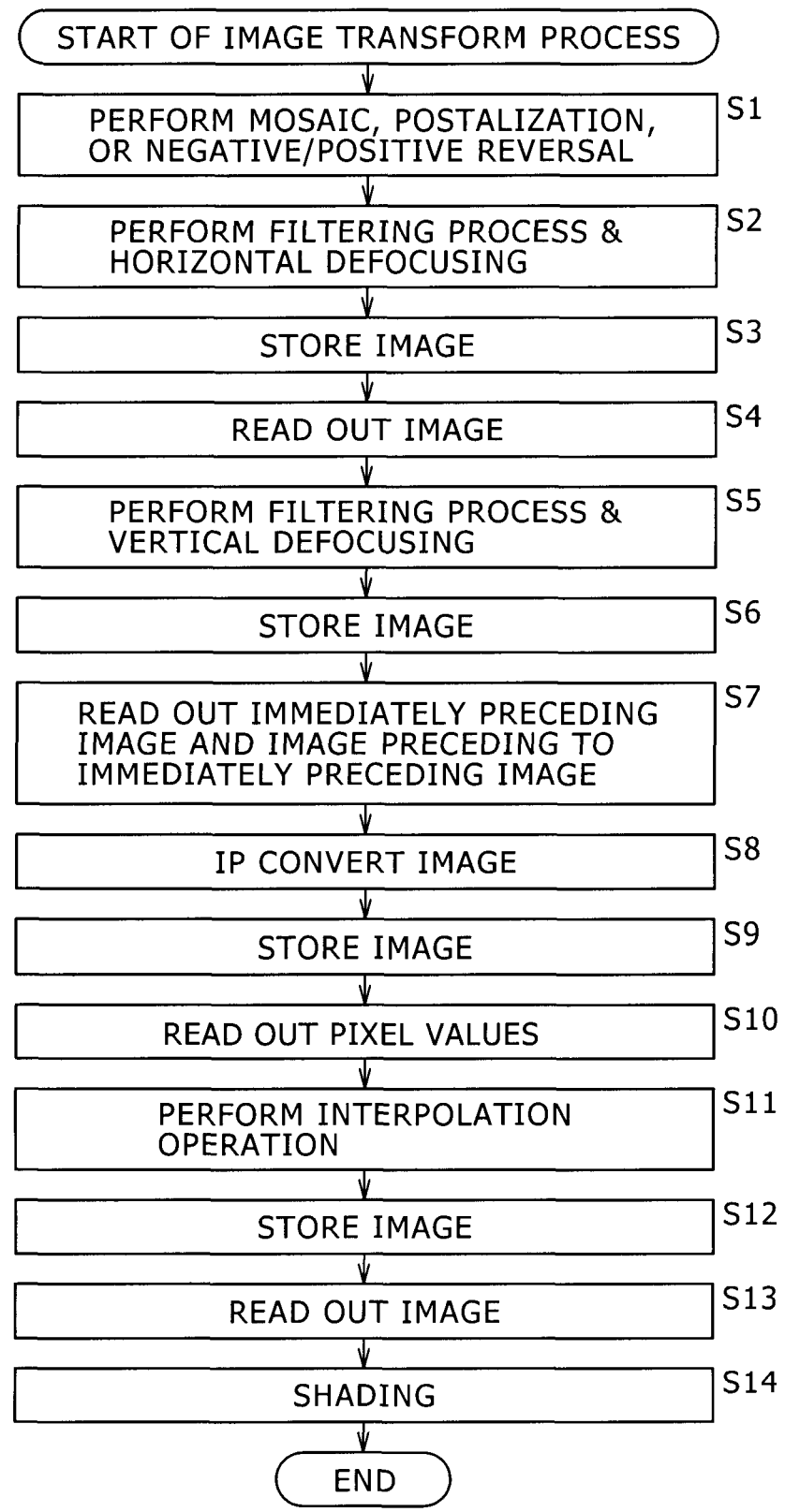
FIG. 2 is a flow chart illustrating an image transform process.

It is to be noted that the processes at steps S1 to S9 of the image transform process of FIG. 2 described above are performed in a unit of a pixel before the interpolation, and the processes at steps S10 to S14 are executed in a unit of an interpolation pixel.

Figure 3:
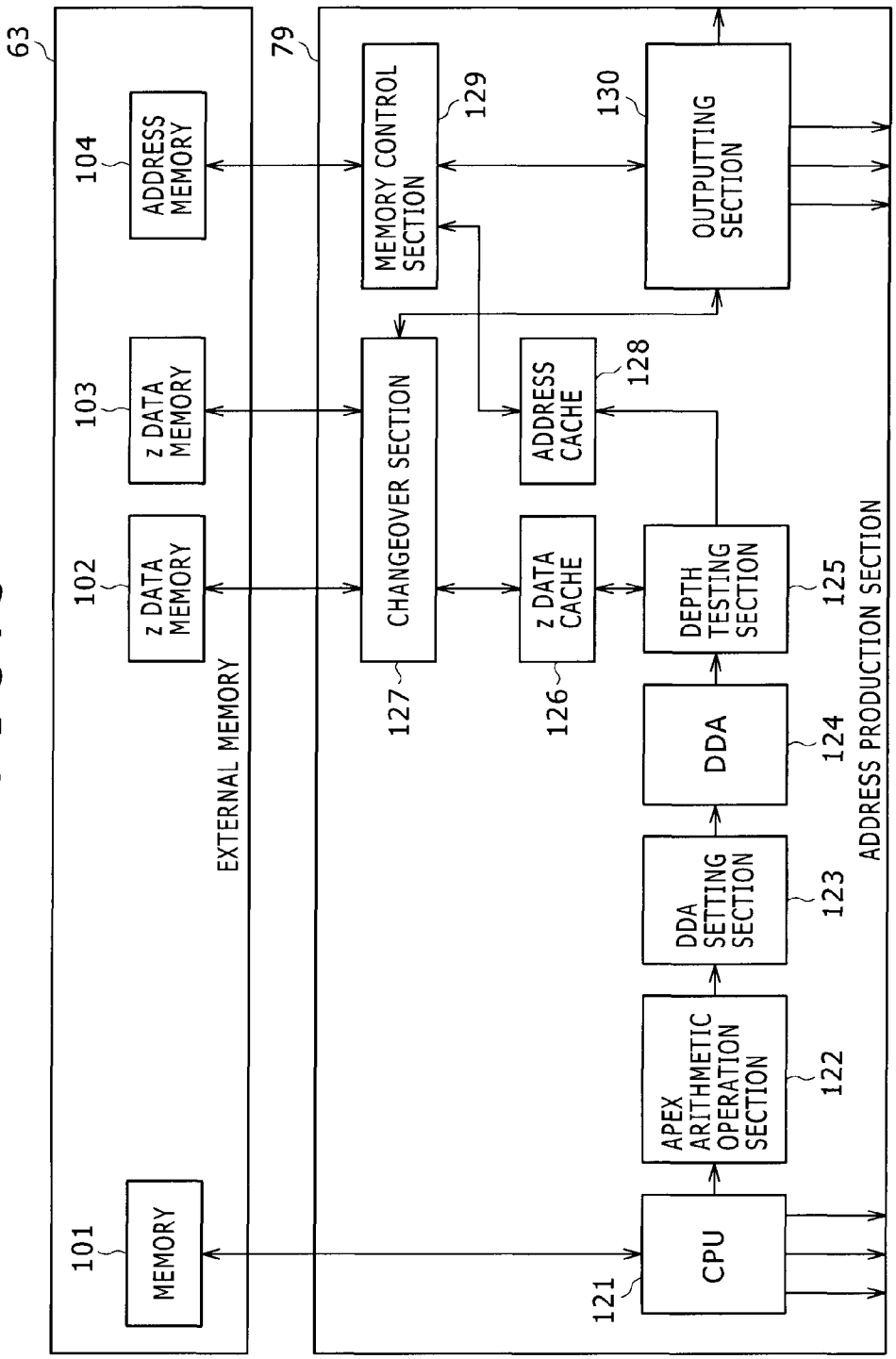
FIG. 3 is a block diagram showing an example of a detailed configuration of an external memory and an address production section shown in FIG. 1.

FIG. 3 shows an example of a detailed configuration of the external memory 63 and the address production section 79 shown in FIG. 1.

Referring to FIG. 3, the external memory 63 shown includes a memory 101, a z data memory 102, another z data memory 103, and an address memory 104.

Meanwhile, the address production section 79 includes a CPU (Central Processing Unit) 121, an apex arithmetic operation section 122, a DDA (Digital Differential Analyzer) setting section 123, a DDA 124, and a depth testing section 125. The address production section 79 further includes a z data cache 126, a changeover section 127, an address cache 128, a memory control section 129, and an outputting section 130.

The CPU 121 controls the components of the image processing system 51 in accordance with a program stored in the memory 101 of the external memory 63.

For example, the CPU 121 supplies an instruction signal for the instruction of a mosaic effect, a posterization effect or a negative/positive reversal effect to the pre-processing section 71 in response to an instruction of the user. Further, the CPU 121 supplies an instruction signal for the instruction of defocusing in the horizontal direction to the horizontal filter 72 or supplies an instruction signal for the instruction of defocusing in the vertical direction to the vertical filter 73 in response to an instruction of the user.

Furthermore, the CPU 121 supplies a reduction ratio in the horizontal direction to the horizontal filter 72 and supplies a reduction ratio in the vertical direction to the vertical filter 73 in response to an instruction of the user. Further, the CPU 121 produces data (hereinafter referred to as apex data) regarding apexes of polygons, which compose a model corresponding to an image of a unit of a frame after transform, in a predetermined order in a unit of a polygon in response to a modeling operation of the user. Then, the CPU 121 supplies the produced apex data to the apex arithmetic operation section 122.

It is to be noted that the polygon data include, for example, coordinate values of each apex on a modeling coordinate system and data in a unit of an apex such as a texture address and a writing coefficient.

Further, the CPU 121 controls writing into and reading out from the memory 101. For example, the CPU 121 supplies an intermediate result or a final result of processing to the memory 101 together with a control signal for controlling writing into the memory 101 so that the intermediate result or final result of processing is stored into the memory 101. Further, the CPU 121 supplies a control signal for controlling reading out from the memory 101 to the memory 101 to read out the intermediate result or final result of processing from the memory 101 and performs such various processes as described above.

The apex arithmetic operation section 122 performs apex arithmetic operation such as modeling conversion such as parallel movement, enlargement or reduction or rotation, clipping and perspective projection conversion for the projection on a screen in a unit of a polygon based on apex data supplied from the CPU 121. The apex arithmetic operation section 122 supplies apex data obtained in a unit of a polygon by the apex arithmetic operation to the DDA setting section 123. The DDA setting section 123 calculates parameters necessary for the DDA 124 such as a variation of the texture address by a change of the position on the screen based on the apex data in a unit of a polygon from the apex arithmetic operation section 122. The DDA setting section 123 supplies the apex data and the parameters of a unit of a polygon to the DDA 124.

The DDA 124 converts the apex data of a unit of a polygon into pixel data based on the parameters supplied from the DDA setting section 123. It is to be noted that the pixel data are data of a unit of a pixel which include z data representative of the z coordinate of a point at which a straight line interconnecting a virtual eye point and the pixel on the screen cross the plane, the texture address, the writing coefficient and data (hereinafter referred to as position data) representative of the position of the pixel on an output image. Further, it is assumed that, in the following description, the texture address is data of one word.

The DDA 124 supplies pixel data obtained by the conversion to the depth testing section 125. The depth testing section 125 uses the pixel data from the DDA 124 and pixel data of the pixel, which corresponds to the pixel data, stored in the z data cache 126 to perform a shadow face erasure process.

In particular, the depth testing section 125 issues a request to read out z data stored in an associated relationship with an address (hereinafter referred to as z data pixel unit address) of a unit of a pixel associated with the position data included in the pixel data from the DDA 124 to the z data cache 126. Then, the depth testing section 125 acquires the z data read out in response to the request from the z data cache 126.

Then, the depth testing section 125 compares the z data with z data included in the pixel data from the DDA 124 to perform a depth test of deciding whether or not a polygon (which is hereinafter referred to suitably as new polygon) corresponding to the pixel data from the DDA 124 is positioned on the virtual view point side with respect to the polygon (hereinafter referred to suitably as old polygon) corresponding to the z data stored already in the z data cache 126.

The depth testing section 125 supplies, in response to a result of the depth test, the z data and the writing coefficient included in the pixel data of the new polygon positioned on the virtual view point side with respect to the old polygon to the z data cache 126 together with a z data pixel unit address corresponding to the pixel data. As a result, the z data cache 126 updates the z data and the writing coefficient of the old polygon stored in an associated with the z data pixel unit address from the depth testing section 125 with the z data and the writing coefficient of the new polygon, respectively.

Further, the depth testing section 125 outputs the texture address included in the pixel data of the new polygon positioned on the virtual view point side with respect to the old polygon to the address cache 128 together with an address of a unit of a pixel corresponding to the position data included in the pixel data, that is, an address (hereinafter referred to as texture word unit address) for each texture address in a unit of a word.

The z data cache 126 temporarily stores the z data and the writing coefficient of a unit of a cache block as a cache block in an associated relationship with an address (hereinafter referred to as z data cache block unit address) of a unit of a cache block in the z data memory 102 or 103, in which the z data and the writing coefficient are stored, into a cache block region.

Further, the z data cache 126 searches, based on the z data pixel unit address supplied from the depth testing section 125, z data already stored therein for the z data corresponding to the z data pixel unit address whose reading out is demanded from the depth testing section 125. In particular, the z data cache 126 searches for a cache block including the z data of an object of request stored in an associated relationship with the z data cache block unit address corresponding to the z data pixel unit address from the depth testing section 125, and determines the z data of the object of the request in the cache block as a search result.

If the z data of the object of the request is searched out, then the z data cache 126 supplies the z data of the search result and the corresponding writing coefficient to the depth testing section 125. If the z data of the object of the request is not searched out, that is, if a cache block including the z data of the object of request is not stored, then the z data cache 126 transmits the z data cache block unit address corresponding to the z data pixel unit address supplied from the depth testing section 125 together with the z data to the changeover section 127 to request the changeover section 127 to read out the z data of the object of the request and the corresponding writing coefficient. Consequently, the z data and the writing coefficient are read out in a unit of a block from the z data memory 102 or 103.

The z data cache 126 further stores z data and a writing coefficient of a unit of a cache block supplied from the changeover section 127 in response to the request temporarily as a cache block into the cache block region in an associated relationship with the z data cache block unit address transmitted to the changeover section 127 upon the request. Then, the z data cache 126 supplies the z data to the depth testing section 125.

Further, the z data cache 126 performs eviction of a cache block when it does not have a cache block region which can store. In particular, the z data cache 126 decides a cache block which makes an object of eviction, reads out the cache block and the z data cache block unit address associated with the cache block and supplies the cache block and the z data cache block unit address to the changeover section 127 together with an eviction request.

The changeover section 127 controls writing into and reading out from the z data memories 102 and 103. In particular, the changeover section 127 changes over the z data memory to be controlled from one to the other of the z data memories 102 and 103 of the external memory 63 in response to the request of the z data cache 126 or of the outputting section 130. For example, the changeover section 127 reads out, from one of the z data memories 102 and 103, the z data and the writing coefficient of a unit of a cache block stored in the z data cache block unit address from the z data cache 126 in response to the reading out request from the z data cache 126. The changeover section 127 supplies the read out z data and writing coefficient to the z data cache 126.

Further, the changeover section 127 stores the z data and the writing coefficient supplied thereto as a cache block into the z data cache block unit address supplied from the z data cache 126 in one of the z data memories 102 and 103 in response to an eviction request from the z data cache 126.

Further, the changeover section 127 reads out the z data and the writing coefficient from the other one of the z data memories 102 and 103 in response to a request from the outputting section 130 and supplies the z data and the writing coefficient to the outputting section 130. Thereafter, the changeover section 127 clears the read out z data and writing coefficient stored in the other one of the z data memories 102 and 103.

As described above, one of the z data memory 102 and the z data memory 103 stores z data and a corresponding writing coefficient for comparison by the depth testing section 125 while the other one of the z data memories 102 and 103 stores z data and a writing coefficient after the end of the depth test outputted through the outputting section 130.

In other words, the changeover section 127 performs changeover every time pixel data corresponding to a model for one frame are supplied to the depth testing section 125.

The address cache 128 temporarily stores, based on a texture word unit address from the depth testing section 125, a texture address of a cache block address including a texture address outputted together with the texture word unit address as a cache block in an associated relationship with an address (hereinafter referred to as texture cache block unit address) of a cache block unit in the address memory 104, in which the cache block is stored, in the cache block region.

Further, when the address cache 128 does not have a cache block region which can store, the address cache 128 performs eviction of a cache block. In particular, the address cache 128 determines a cache block of an object of eviction, reads out the cache block, a texture cache block unit address or the like associated with the cache block and so forth, and supplies the thus read out texture cache block unit address and so forth to the memory control section 129 together with an eviction request.

It is to be noted that details of the address cache 128 are hereinafter described with reference to FIGS. 5 to 8.

The memory control section 129 controls writing into and reading out from the address memory 104 which may be formed from an SDRAM or the like. In particular, the memory control section 129 stores a texture address of a unit of a cache block supplied as a cache block from the address cache 128 in a unit of a cache block into a texture cache block unit address of the address memory 104 supplied together with the cache block to correct the texture address stored in the address memory 104 in response to a request from the address cache 128.

At this time, the memory control section 129 uses a correction flag of a unit of a word hereinafter described, which is supplied from the memory control section 129, as a write mask signal to store a texture address of a unit of a cache block thereby in the address memory 104 to correct only a texture address, which need be corrected, from among texture addresses corresponding to the texture address of a unit of a cache block stored in the address memory 104.

Further, the memory control section 129 reads out a texture address from the address memory 104 in response to a request from the outputting section 130 and supplies the read out texture address to the outputting section 130. Thereafter, the memory control section 129 clears the read out texture address stored in the address memory 104.

The outputting section 130 issues a request for reading out the z data and the writing coefficient of pixels after transform outputted from the addition section 77 in the order of the pixels and issues a request to read out a texture address to the memory control section 129. The outputting section 130 outputs, from between the z data and the writing coefficient supplied thereto from the changeover section 127 in response to the request, the z data to another DME or the like, and supplies the writing coefficient to the addition section 77. Further, the outputting section 130 supplies the integral part of a texture address supplied thereto from the memory control section 129 in response to the request to the RAM module 75 and supplies the decimal part of the texture address to the interpolation operation section 76.

Figure 4:
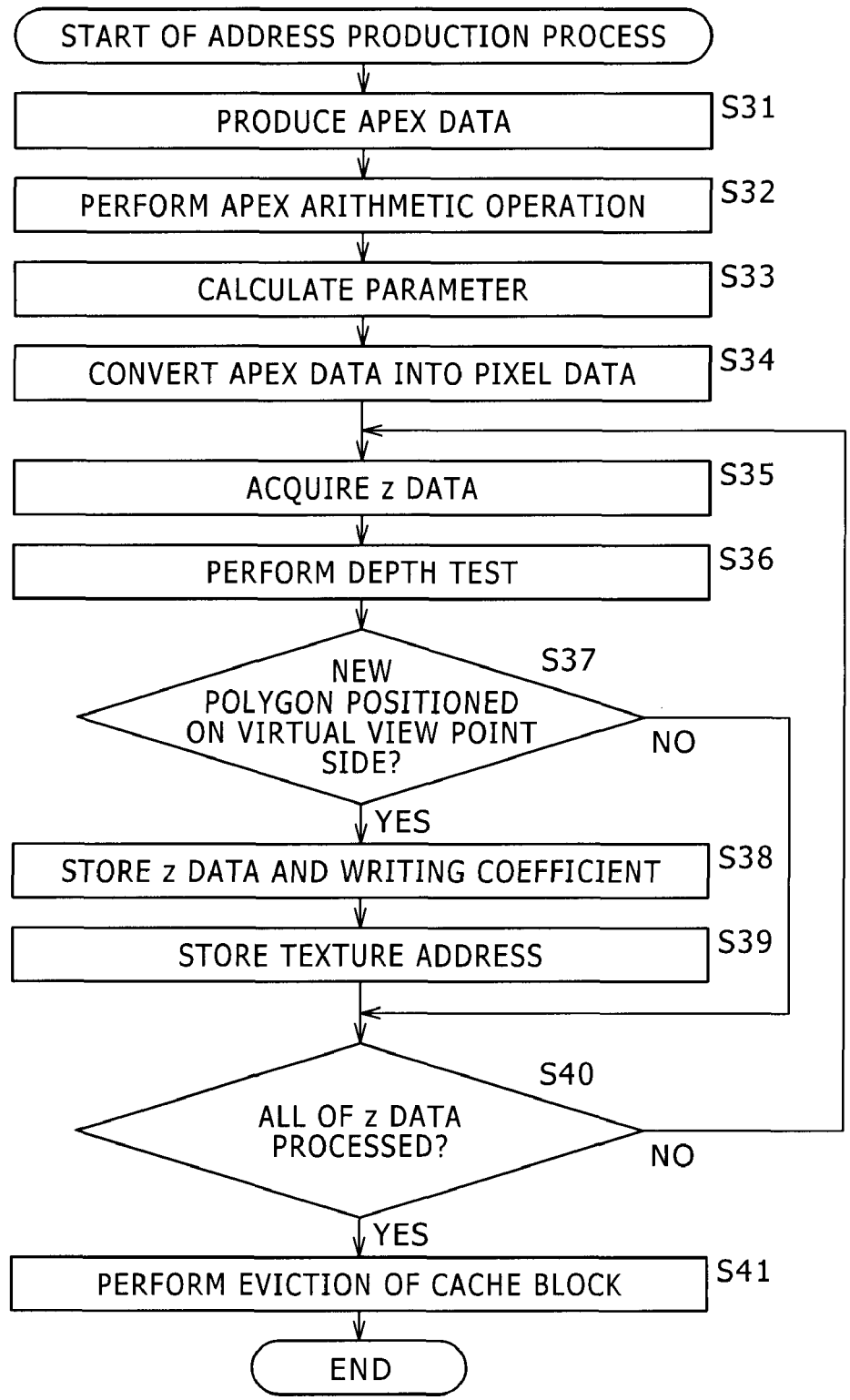
FIG. 4 is a flow chart illustrating an address production process.

Now, an address production process by the address production section 79 of producing a texture address is described with reference to FIG. 4. This address production process is started, for example, when the user performs a modeling operation. It is to be noted that the address production process of FIG. 4 is executed for each model corresponding to an image of a unit of a frame after transform.

At step S31, the CPU 121 produces apex data of polygons, which compose a model corresponding to an image after transform, in a predetermined order in response to a modeling operation of the user and supplies the produced apex data to the apex arithmetic operation section 122.

After the process at step S31, the processing advances to step S32, at which the apex arithmetic operation section 122 performs apex arithmetic operation for each polygon based on apex data supplied from the CPU 121. The apex arithmetic operation section 122 supplies apex data of a unit of a polygon obtained as a result of the apex arithmetic operation to the DDA setting section 123.

After the process at step S32, the processing advances to step S33, at which the DDA setting section 123 calculates parameters necessary for the DDA 124 based on the apex data of a unit of a polygon from the apex arithmetic operation section 122. The DDA setting section 123 supplies the apex data and the parameters of a unit of a polygon to the DDA 124.

After the process at step S33, the processing advances to step S34, at which the DDA 124 converts the apex data of a unit of a polygon into pixel data based on the parameters supplied from the DDA setting section 123 and supplies the pixel data to the depth testing section 125.

After the process at step S34, the processing advances to step S35, at which the depth testing section 125 issues a request to read out the z data of a pixel corresponding to the pixel data from the DDA 124 to the z data cache 126. Then, the depth testing section 125 acquires z data read out in response to the request.

After the process at step S35, the processing advances to step S36, at which the depth testing section 125 compares the z data acquired at step S35 with the z data included in the pixel data from the DDA 124 to perform a depth test of deciding whether or not the new polygon is positioned on the virtual view point side with respect to the old polygon.

After the process at step S36, the processing advances to step S37, at which the depth testing section 125 decides whether or not the new polygon is positioned on the virtual view point side with respect to the old polygon.

If it is decided at step S37 that the new polygon is positioned on the virtual view point side with respect to the old polygon, then the depth testing section 125 supplies the z data and the writing coefficient included in the pixel data corresponding to the new polygon and the z data pixel unit address to the z data cache 126. Further, the depth testing section 125 supplies the texture address and the texture word unit address to the address cache 128.

Thereafter, at step S38, the z data cache 126 stores the z data and the writing coefficient from the depth testing section 125 in an associated relationship with the z data pixel unit address to update the z data and the writing coefficient of the old polygon with the z data and the writing coefficient of the new polygon.

After the process at step S38, the processing advances to step S39, at which the address cache 128 stores the texture address in an associated relationship with the texture word unit address.

When it is decided at step S37 that the new polygon is not positioned on the virtual view point side with respect to the old polygon, that is, when the old polygon is positioned on the virtual view point side with respect to the new polygon, or after the process at step S39, the processing advances to step S40. At step S40, the depth testing section 125 decides whether or not the depth test has been performed for all z data corresponding to the model for one frame and supplied from the DDA 124. If it is decided that the depth test has not been performed for all z data, then the processing returns to step S35 so that the processes at the steps beginning with step S35 are performed similarly.

On the other hand, if it is decided at step S40 that the depth test has been performed for all z data, then the processing advances to step S41, at which the z data cache 126 and the address cache 128 perform eviction of a cache block.

In particular, the z data cache 126 supplies cache blocks stored in the cache block region and z data cache block unit addresses stored in an associated relationship with the cache blocks to the z data memory 102 or 103 through the changeover section 127.

It is to be noted that, at this time, the z data cache 126 may perform eviction of cache blocks stored in all cache block regions or may perform eviction of a cache block for which the updating has been performed.

Figure 8:
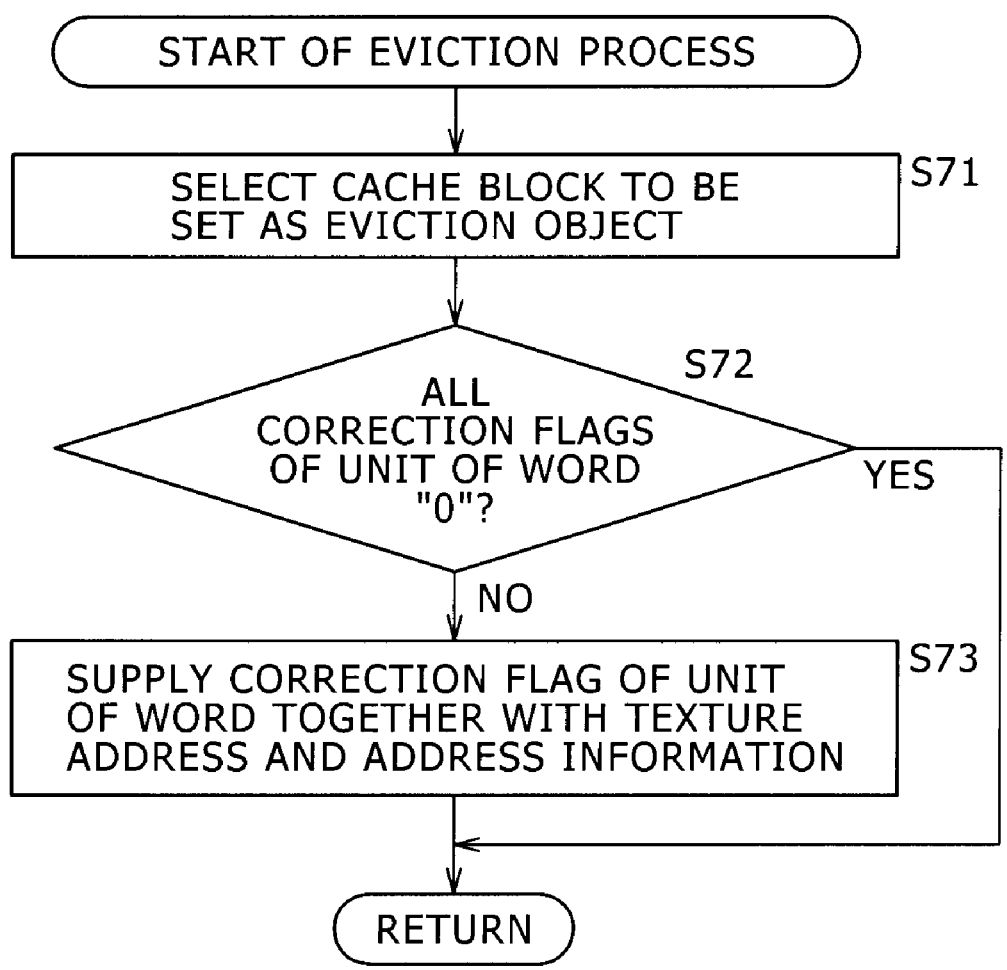
FIG. 8 is a flow chart illustrating an eviction process.

Further, the address cache 128 performs an eviction process of FIG. 8 hereinafter described in which all cache blocks are made an object of eviction.

After the address production process of FIG. 4, the outputting section 130 acquires the z data and the writing coefficient of pixels from the changeover section 127 in an order in which the pixels are outputted from the addition section 77. Then, the outputting section 130 outputs the z data to another DME or the like and supplies the writing coefficients to the addition section 77. Further, the outputting section 130 acquires the texture address of the pixel from the memory control section 129 and supplies the integral part of the texture address to the RAM module 75 while it supplies the decimal part of the texture address to the inter polation operation section 76.

Figure 5:
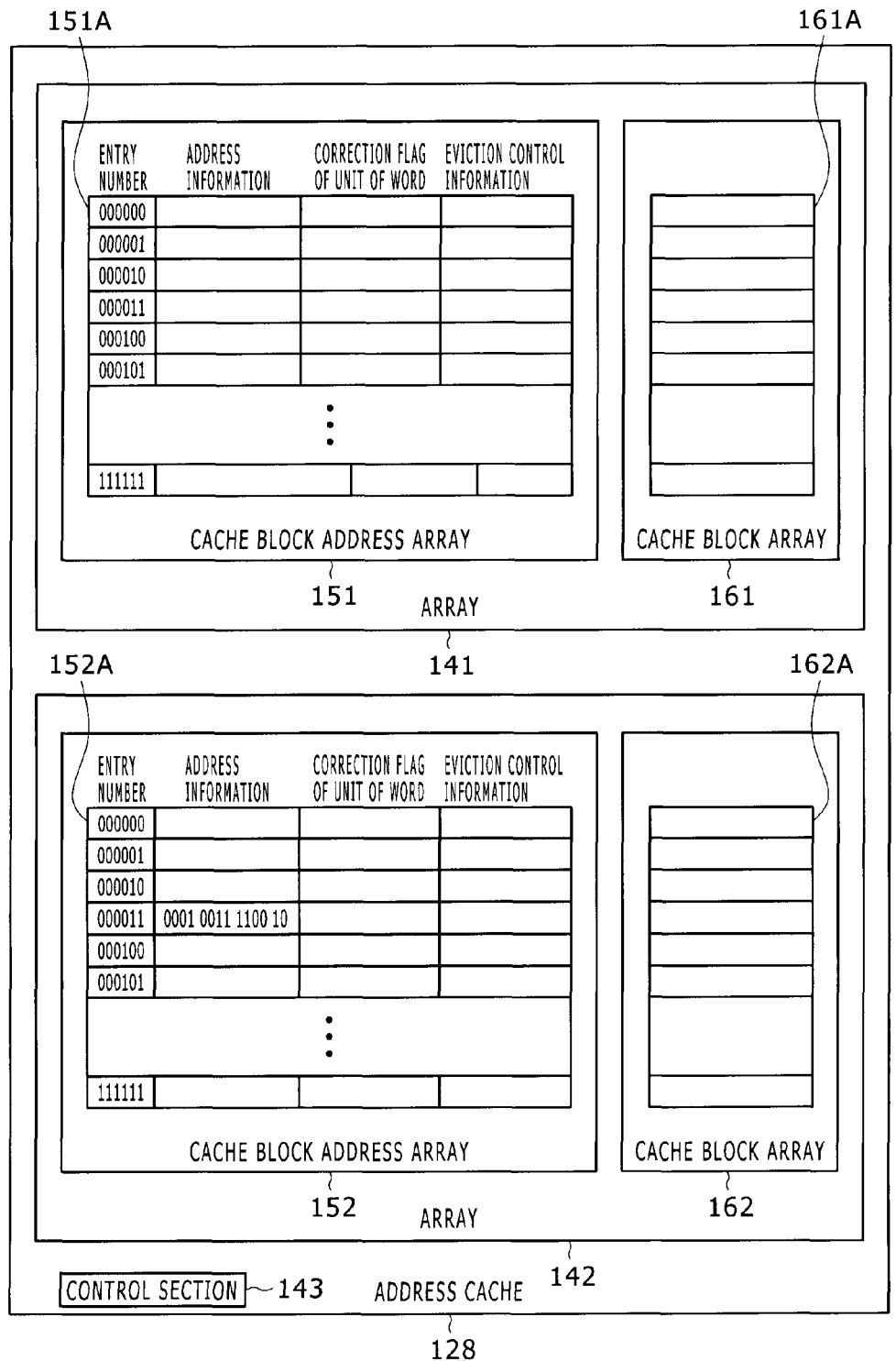
FIG. 5 is a diagrammatic view illustrating an example of a detailed configuration of an address cache shown in FIG. 3.

FIG. 5 shows an example of a detailed configuration of the address cache 128.

The address cache 128 of FIG. 5 is a cache of the two-way set associative mapping type and includes two arrays 141 and 142 and a control section 143.

The array 141 includes a cache block address array 151 and a cache block array 161 while the array 142 includes a cache block address array 152 and a cache block array 162.

The cache block address array 151 includes a number of pieces of cache block information 151A equal to the number of cache block regions 161A which compose the cache block array 161. The cache block information 151A includes an entry number, address information, a correction flag of a unit of a word, and eviction control information. The entry number is a number applied to each of the cache block regions 161A which compose the cache block array 161 and corresponds to a cache block region 161A.

In the example of FIG. 5, the cache block array 161 includes 64 cache block regions 161A, to each of which one of numbers from zero ("000000") to 63 ("111111") is applied. Accordingly, the entry number is one of zero to 63.

The address information is information of a texture cache block unit address in which a texture address of a unit of a cache block stored in the cache block region 161A to which the corresponding entry number 151A is applied is stored.

A correction flag of a unit of a word represents in a unit of a word whether or not a texture address of a unit of a word stored in the corresponding cache block region 161A is data necessary to correct a texture address stored in the address memory 104 corresponding to the texture address.

The eviction control information represents whether or not eviction of a cache block from the corresponding cache block region 161A should be performed preferentially to a cache block region 162A of the cache block array 162 to which an entry number same as the entry number applied to the cache block region 161A is applied.

The cache block array 161 includes 64 cache block regions 161A to each of which one of the entry numbers of zero to 63 is applied. Each of the cache block regions 161A stores a texture address of 16 words which form a cache block, that is, a texture address included in pixel data of 16 pixels as a cache block.

As described above, the array 141 uses the entry numbers to associate the pieces of the cache block information 151A of the cache block address array 151 and the cache block data stored in the cache block regions 161A of the cache block array 161 with each other.

It is to be noted that, since the array 142 is formed similarly to the array 141, description thereof is omitted herein to avoid redundancy. However, in the example of FIG. 5, address information "0001 0011 1100 10" is stored in an associated relationship with the entry number "000011" of the cache block address array 152 of the array 142.

A texture address and a texture word unit address are supplied from the depth testing section 125 to the control section 143. The control section 143 stores the texture address into the cache block array 161 or 162 based on the texture word unit address. Further, the control section 143 performs eviction of a cache block if another texture address stored already is stored in the cache block regions 161A and 162A which can store the texture address from the depth testing section 125.

It is to be noted that, in the following description, where there is no necessity to identify the arrays 141 and 142 from each other, they are referred to collectively as arrays 140, and where there is no necessity to identify the cache block address arrays 151 and 152, they are referred to collectively as cache block address arrays 150. Further, where there is no necessity to identify the cache information 151A and 152A from each other, they are referred to collectively as cache block information 150A, and where there is no necessity to identify the cache block arrays 161 and 162 from each other, they are referred to collectively as cache block address arrays 160.

Further, where there is no necessity to identify the cache block regions 161A and 162A, they are referred to collectively as cache block regions 160A.

FIG. 6 illustrates an example of a texture word unit address to be supplied from the depth testing section 125 to the address cache 128.

The first stage of FIG. 6 illustrates a texture word unit address represented in hexadecimal notation, and the second stage illustrates the texture word unit address represented in binary notation. In particular, where the texture word unit address in FIG. 6 is represented by a hexadecimal number, it is "13C834", but where it is represented by a binary number, it is "0001 0011 1100 1000 0011 0100".

The 24-bit texture word unit address of FIG. 6 is formed from address information of 14 bits, an entry number of six bits, and an offset of four bits disposed in order from the MSB side. Here, the offset is information representative of in what numbered word from the top of the cache block region 160A the texture address should be stored.

When the texture word unit address illustrated in FIG. 6 is supplied from the depth testing section 125 to the control section 143 shown in FIG. 5, the control section 143 decides from the address information "0001 0011 1100 10" of the high-order 14 bits and the entry number "000011" of six bits of the texture word unit address whether or not the address information "0001 0011 1100 10" is stored in an associated relationship with the entry number "000011" of the cache block address array 150.

Since the address information "0001 0011 1100 10" is stored in an associated relationship with the entry number "000011" in the cache block address array 152, the texture address from the depth testing section 125 is stored into the eighth word represented by the offset "0100" from the top of the cache block region 162A of the cache block array 162 to which the entry number "000011" is applied.

Now, a storage process by the address cache 128 of storing a texture address is described with reference to FIG. 7. This storage process corresponds to the step S39 illustrated in FIG. 4.

At step S51, the control section 143 decides whether or not one of the cache block regions 160A in the two cache block arrays 160 hits as a cache block region corresponding to a texture work unit address supplied from the depth testing section 125. More particularly, the control section 143 decides whether or not the address information included in the texture word unit address is included in the cache block information 150A corresponding to the entry included in the texture word unit address (FIG. 6) of one of the cache block address arrays 150 and 151.

If it is decided at step S51 that any one of the cache block regions 160A does not hit, then the processing advances to step S52, at which the control section 143 performs an eviction process of evicting a cache block. Details of the eviction process are hereinafter described with reference to FIG. 8.

After the process at step S52, the processing advances to step S53, at which the control section 143 stores the address information included in the texture word unit address from the depth testing section 125 as address information of the cache block information 150A corresponding to the cache block region 160A determined as an object of eviction.

If it is decided at step S51 that one of the cache block regions 160A hits or after the process at step S53, the processing advances to step S54. At step S54, the control section 143 stores the texture address into the word of the order number represented by the offset included in the texture word unit address from the depth testing section 125 from the top of the cache block region 160A of the object of eviction.

After the process at step S54, the processing advances to step S55, at which the control section 143 sets the correction flag in a unit of a word corresponding to the number of the word, in which the texture address is stored at step S52, of the cache block information 150A corresponding to the cache block region 160A of the object of eviction, that is, the cache block information 150A which includes the address information stored at step S53 to "1" which represents that the correction flag is data necessary to be corrected.

After the process at step S55, the processing advances to step S56, at which the control section 143 updates the two pieces of eviction control information included in the cache block information 150A corresponding to the cache block region 160A of the object of eviction and the cache block information 150A stored in another cache block address array 150 and including the entry number same as the entry number included in the cache block information 150A.

For example, the control section 143 updates, from between the two pieces of eviction control information, that piece of the eviction control information which is included in the cache block information 150A together with the correction flag of a unit of a word set at step S55 into information representing that the information should not be evicted preferentially. Further, the control section 143 updates the other piece of eviction control information into information representing that the information should be evicted preferentially.

Consequently, eviction of a cache block region 160A in which the oldest texture address is stored from among the cache block regions 160A to which the same entry number is applied can be performed preferentially. In other words, when a cache block including a texture memory is supplied from the depth testing section 125, another cache block including another texture memory stored prior to the texture memory is supplied preferentially to the address memory 104.

Figure 7:
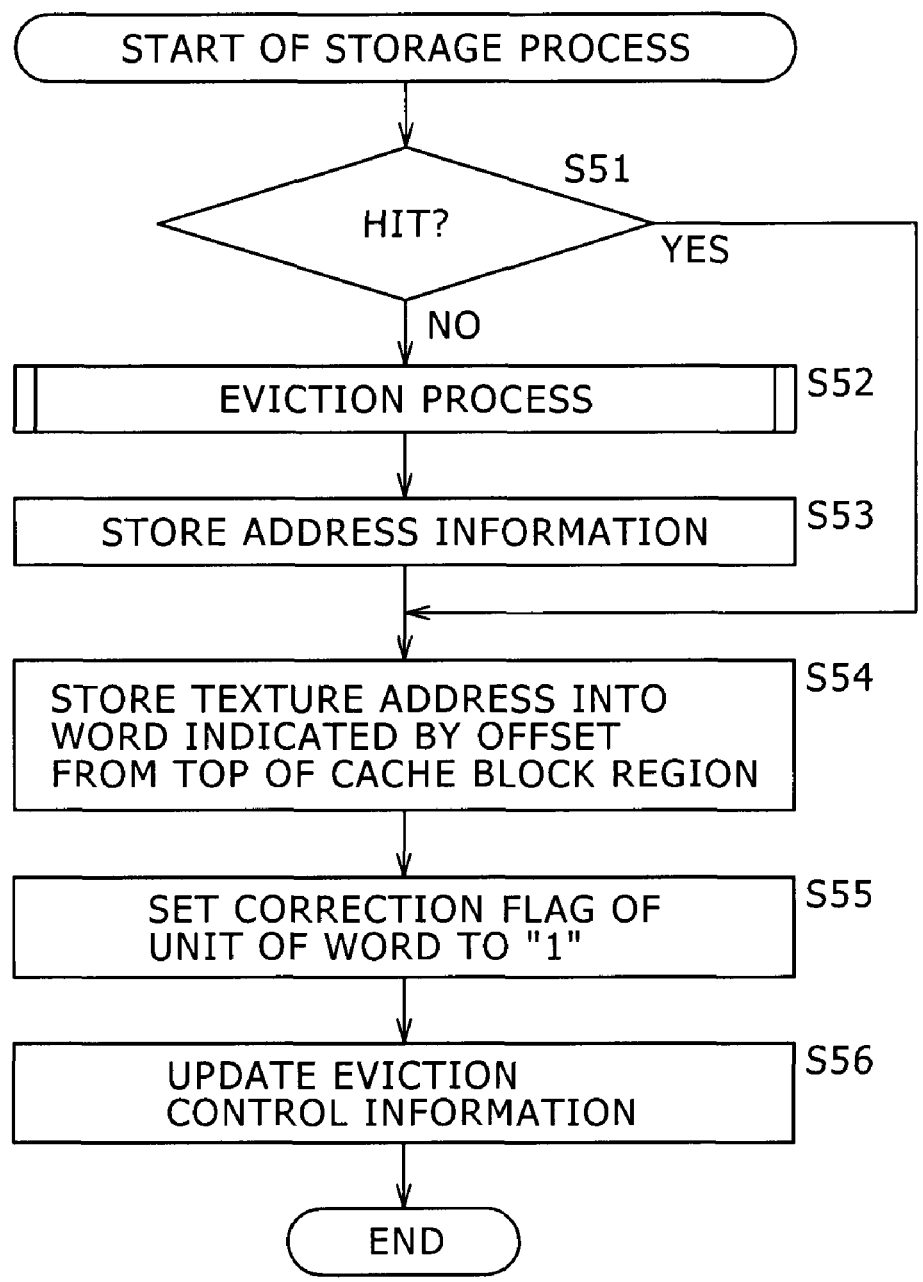
FIG. 7 is a flow chart illustrating a storage process.

Now, the eviction process at step S52 of FIG. 7 is described with reference to FIG. 8.

At step S71, the control section 143 selects, based on two pieces of eviction control information included in the cache block information 150A together with an entry number same as the entry number included in a texture word unit address supplied from the depth testing section 125, a cache block stored in the cache block region 160A corresponding to eviction control information representing preferential eviction from between the two pieces of eviction control information as a cache block of an object of eviction. Then, the processing advances to step S73.

At step S72, the control section 143 decides whether or not all of the correction flags of a unit of a word corresponding to the cache block of the object of eviction are "0". If it is decided that all of the correction flags are not "0", then the processing advances to step S73.

At step S73, the control section 143 reads out the cache block of the object of eviction, and reads out the texture cache block unit address represented by the address information included in the corresponding cache block information 151A and the correction flag of a unit of a word. Then, the control section 143 supplies the texture address and the texture cache block unit address to the address memory 104 through the memory control section 129. Further, the control section 143 supplies the texture cache block unit address as a write mask signal to the address memory 104 through the memory control section 129.

Thereafter, the memory control section 129 uses the write mask signal from the control section 143 to store the texture address of 16 words supplied from the control section 143 into the texture cache block unit address of the address memory 104. Consequently, the address memory 104 can correct any texture address corresponding to "1" of the correction flag from among the texture addresses stored in the address memory 104 to the texture address which composes the texture address of 16 words supplied from the control section 143 corresponding to the texture address.

If it is decided at step S72 that all of the correction flags of a unit of a word are "0" or after the process at step S73, the processing returns to step S52 of FIG. 7 and then the processes at the steps beginning with step S53 are executed.

As described above, since the control section 143 stores correction flags of a unit of a word, if a correction flag is transmitted as a write mask signal together with a texture address of 16 words, then the address memory 104 can correct only the texture address of a word which is necessary to correct from within the texture address of 16 words.

As a result, the address cache 128 need not correct the texture address stored in the address memory 104 on the address cache 128 in order to perform collective writing into the address memory 104. Therefore, it is not necessary to perform unnecessary reading-in in order to maintain the access efficiency, and the memory area can be saved. Consequently, the power consumption and the production cost can be reduced.

Figure 9:
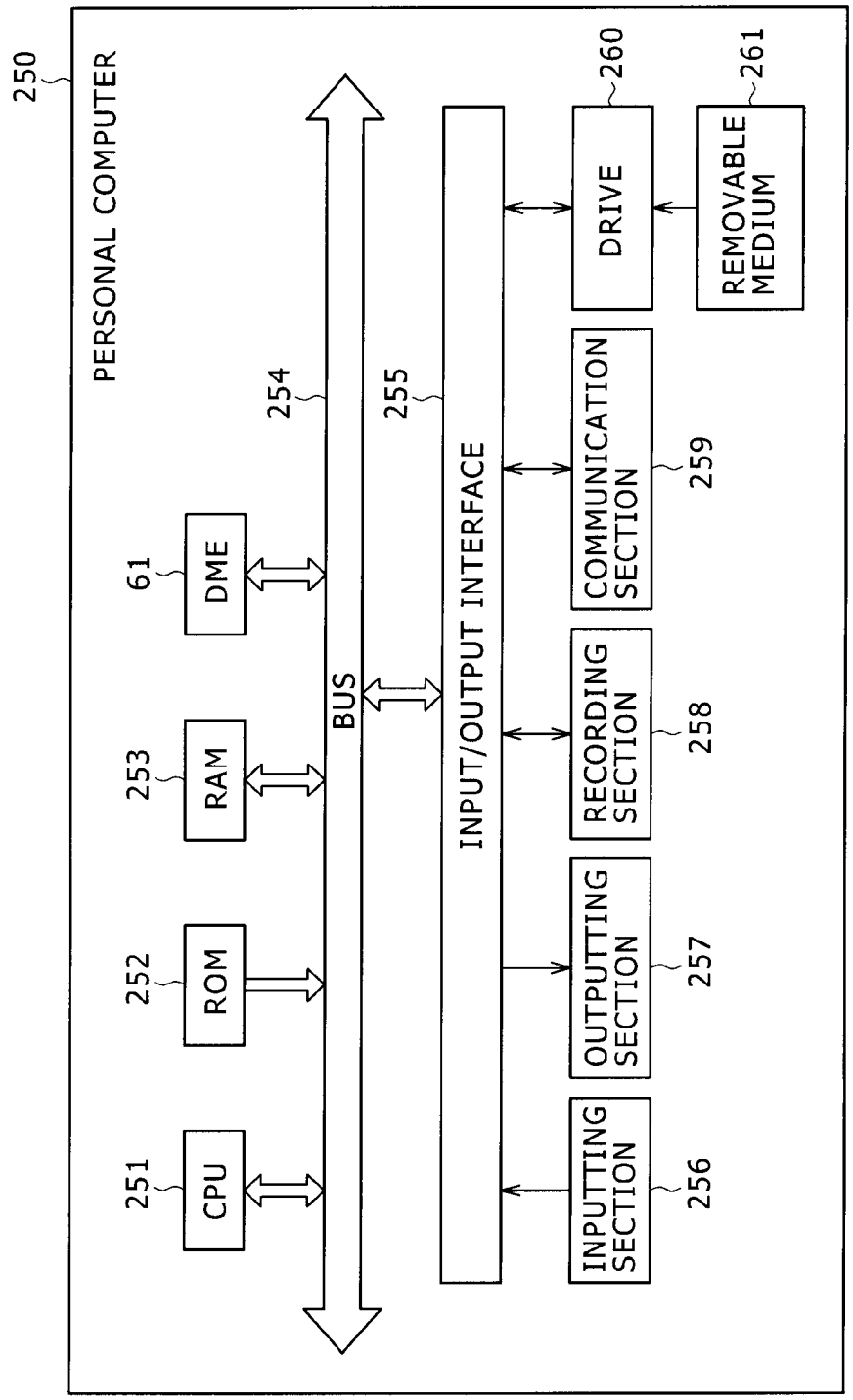
FIG. 9 is a block diagram showing an example of a configuration of an image processing apparatus.

Now, an example of an information processing apparatus 250 in the form of a personal computer in which the DME 61 shown in FIG. 1 is incorporated is described with reference to FIG. 9.

The information processing apparatus 250 includes a CPU 251 and a DME 61 which execute various processes in accordance with a program stored in a ROM (Read Only Memory) 252 or recorded in a recording section 258. A program to be executed by the CPU 251, data to be used by the CPU 251 and so forth are suitably stored into a RAM (Random Access Memory) 253. The DME 61, CPU 251, ROM 252 and RAM 253 are connected to each other by a bus 254.

Also an input/output interface 255 is connected to the CPU 251 through the bus 254. An inputting section 256 including a keyboard, a mouse, a microphone, a reception section for receiving an instruction transmitted from a remote controller not shown and so forth and an outputting section 257 including a display unit, a speaker and so forth are connected to the input/output interface 255. The CPU 251 executes various processes in response to an instruction inputted from the inputting section 256. Then, the CPU 251 outputs results of the processes to the outputting section 257.

For example, the CPU 251 controls the DME 61 in response to an instruction inputted from the inputting section 256 to perform reduction, enlargement, change of the type, rotation, leftward and rightward reversal, inversion or movement of an input image or apply a special effect to an input image. Then, the CPU 251 controls the outputting section 257 to display an image based on an image after transform outputted from the DME 61.

The recording section 258 connected to the input/output interface 255 includes, for example, a hard disk and stores a program to be executed by the CPU 251 and various data. A communication section 259 communicates with an external apparatus through a network such as the Internet or a local area network. It is to be noted that a program recorded in the recording section 258 may be acquired through the communication section 259.

A drive 260 connected to the input/output interface 255 drives a removable medium 261 such as a magnetic disk, an optical disk, a magneto-optical disk or a semiconductor memory when the removable medium 261 loaded therein to acquire a program or data recorded on the removable medium 261. The acquired program or data is transferred to and recorded by the recording section 258 as occasion demands.

Figure 10:
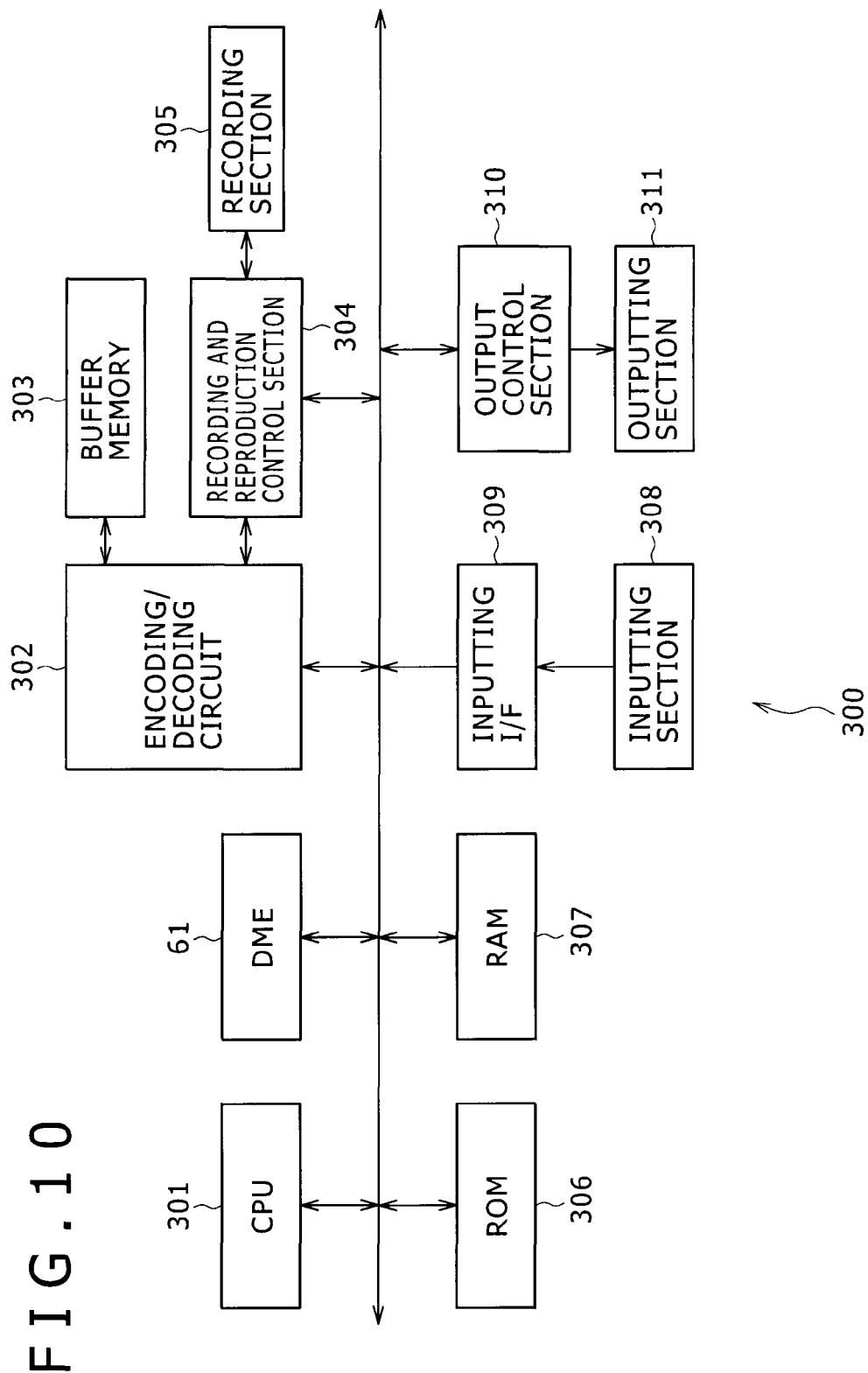
FIG. 10 is a block diagram showing an example of a configuration of a recording and reproduction apparatus.

Now, an example of a recording and reproduction apparatus 300 in which the DME 61 shown in FIG. 1 is incorporated is described with reference to FIG. 10.

The recording and reproduction apparatus 300 includes a CPU 301 and a DME 61 which execute various processes in accordance with a program stored in a ROM 306 or recorded on a recording section 305. A program to be executed by the CPU 301, data to be used by the CPU 301 and so forth are stored suitably into a RAM 307. The DME 61, CPU 301, ROM 306 and RAM 307 are connected to each other by a bus.

Also an input I/F (interface) 309 and the CPU 301 are connected to the CPU 301 through the bus. An inputting section 308 is connected to the input I/F 309 and includes a keyboard, a mouse, a microphone, a reception section for receiving an instruction transmitted from a remote controller not shown and so forth, an image pickup section for picking up an image of an image pickup object and so forth. Meanwhile, an outputting section 311 is connected to an output control section 310 and includes a display unit, a speaker and so forth. The CPU 301 executes various processes in response to an instruction inputted thereto from the inputting section 308 through the input I/F 309. The CPU 301 outputs results of the processes to the outputting section 311 through the output control section 310.

For example, the CPU 301 performs, in response to an instruction inputted thereto from the inputting section 308, reduction, enlargement, change of the type, rotation, leftward and rightward reversal, inversion or movement of an input image or applies a special effect to an input image. Further, the CPU 301 controls the outputting section 311 to display, based on an image outputted from the DME 61, the display through the output control section 310.

Further, an encoding/decoding circuit 302 and a recording and reproduction control section 304 are connected to the CPU 301 through the bus. The encoding/decoding circuit 302 retains an image obtained, for example, as a result of image pickup by the inputting section 308 into a buffer memory 303 as occasion demands and encodes the image in accordance with a predetermined encoding system such as the JPEG (Joint Photographic Experts Group) or MPEG (Moving Picture Experts Group) system under the control of the CPU 301. Then, the encoding/decoding circuit 302 records an image obtained as a result of the encoding into the recording section 305 through the recording and reproduction control section 304.

The recording and reproduction control section 304 controls recording and reproduction of the recording section 305 under the control of the CPU 301. In particular, the recording and reproduction control section 304 controls the recording section 305 to record an image supplied from the encoding/decoding circuit 302 or supplies an image read out from the recording section 305 to the encoding/decoding circuit 302. The encoding/decoding circuit 302 decodes the image from the recording and reproduction control section 304 and supplies an image obtained as a result of the decoding, for example, as an input image to the DME 61 under the control of the CPU 301.

The present invention can be applied, for example, to a GPU (Graphics Processing Unit).

It is to be noted that, in the present specification, the steps which describe the program recorded in a program recording medium may be but need not necessarily be processed in a time series in the order as described, and include processes which are executed in parallel or individually without being processed in a time series.

Further, in the present specification, the term "system" is used to represent an entire apparatus composed of a plurality of devices or apparatus.

While a preferred embodiment of the present invention has been described using specific terms, such description is for illustrative purpose only, and it is to be understood that changes and variations may be made without departing from the spirit or scope of the following claims.

What is claimed is:

1. An image processing apparatus, comprising:

first storage means for storing data in a unit of a word;

second storage means for storing data in a unit of a word, address information for managing writing and reading out of the data of a unit of a word and a correction flag which indicates, in a unit of a word, whether or not it is necessary to correct the data stored in said first storage means, in an associated relationship with each other; and supplying means for reading out and supplying the data of a unit of a word, corresponding address information and a corresponding correction flag stored in said second storage means to said first storage means;

said first storage means referring to the address information supplied from said supplying means to correct the data of a unit of a word corresponding to the correction flag supplied from said supplying means to the data of a unit of a word supplied from said supplying means.

2. The image processing apparatus according to claim 1, wherein said second storage means stores supplying information which indicates whether or not the data of a unit of a word is to be supplied preferentially to said first storage means, and said supplying means selects data of a unit of a word to be set as a supplying object from the data of a unit of a word stored in said second storage means based on the supplying information stored in said second storage means and supplies the data of a unit of a word set as a supplying object, corresponding address information and a corresponding correction flag to said first storage means.

3. The image processing apparatus according to claim 2, wherein said second storage means stores the supplying information in an associated relationship with data of a unit of a word which is set as a storage object so that, when compared with data of a unit of plural words which forms the data of a unit of a word, data of a unit of plural words which form data of a unit of a word stored prior to the data of a unit of a word is stored preferentially into said first storage means.

4. The image processing apparatus according to claim 1, further comprising:

production means for producing apex data, which are data regarding apexes of a polygon, in a unit of a polygon; and conversion means for converting the apex data into pixel data which are data of a unit of a pixel regarding pixels corresponding to the polygons.

5. An image processing method, comprising:

a first storage step of storing data in a unit of a word into first storage means;

a second storage step of storing data of a unit of a word, address information for managing writing and reading out of the data of a unit of a word and a correction flag which indicates, in a unit of a word, whether or not it is necessary to correct the data stored at the first storage step, in an associated relationship with each other into second storage means; and a supplying step of reading out and supplying the data of a unit of a word, corresponding address information and a corresponding correction flag to the first storage means; and wherein, at the first storage step, the address information supplied at the supplying step is referred to correct the data of a unit of a word corresponding to the correction flag supplied at the supplying step to data of a unit of a word supplied at the supplying step.

6. An image processing apparatus, comprising:

a first storage section configured to store data in a unit of a word;

a second storage section configured to store data in a unit of a word, address information for managing writing and reading out of the data of a unit of a word and a correction flag which indicates, in a unit of a word, whether or not it is necessary to correct the data stored in said first storage section, in an associated relationship with each other; and a supplying section configured to read out and supply the data of a unit of a word, corresponding address information and a corresponding correction flag stored in said second storage section to said first storage section;

said first storage section referring to the address information supplied from said supplying section to correct the data of a unit of a word corresponding to the correction flag supplied from said supplying section to the data of a unit of a word supplied from said supplying section.

* * * * *